US006889293B1

(12) United States Patent
Kaxiras et al.

(10) Patent No.: US 6,889,293 B1
(45) Date of Patent: May 3, 2005

(54) DIRECTORY-BASED PREDICTION METHODS AND APPARATUS FOR SHARED-MEMORY MULTIPROCESSOR SYSTEMS

(75) Inventors: Stefanos Kaxiras, Jersey City, NJ (US); Reginald Clifford Young, New York, NY (US)

(73) Assignee: Agere Systems Inc., Allentown, PA (US)

( * ) Notice: Subject to any disclaimer, the term of this patent is extended or adjusted under 35 U.S.C. 154(b) by 756 days.

(21) Appl. No.: 09/591,918

(22) Filed: Jun. 9, 2000

(51) Int. Cl.[7] .............................................. G06F 12/00
(52) U.S. Cl. ...................... 711/147; 711/119; 711/124; 709/213
(58) Field of Search .............................. 711/147, 148, 711/141, 144, 119, 124; 709/213, 214, 216

(56) References Cited

U.S. PATENT DOCUMENTS

| 5,214,766 A | * | 5/1993 | Liu ............................. 711/124 |
| 6,032,228 A | * | 2/2000 | Islam et al. .................. 711/133 |

FOREIGN PATENT DOCUMENTS

EP    0 394 642 A2    10/1990

OTHER PUBLICATIONS

Koufaty et al, "Data Forwarding in Scalable Shared–Memory Multiprocessors," IEEE Transactions on Parallel and Distributed Systems, vol. 7, No. 12, Dec. 1996, pp. 1250–1264.*

Abdel–Shafi et al, "An Evaluation of Fine–Grain Producer Initiated Communication in Cache–Coherent Multiprocessors," Third Int'l. Symposium on High–Performance Computer Architecture, Feb. 1–5, 1997, pp. 204–215.*

Koufaty et al, "Comparing Data Forwarding and Prefetching for Communication–Induced Misses in Shared–Memory MPs," Proceedings of the 12th Internation Conference on Supercomputing, 1998, pp. 53–60.*

Kaxiras et al, "A Study of Three Dynamic Approaches to Handle Widely Shared Data in Shared–Memory Multiprocessors," Proceedings of the 12th International Conference on Supercomputing, 1998, pp. 457–464.*

S.S. Mukherjee et al., "Using Prediction to Accelerate Coherence Protocols," Proceedings of the 25th Annual International Symposium on Computer Architecture (ISCA), pp. 1–12, Jun.–Jul. 1998.

A. Lai et al., "Memory Sharing Predictor: The Key to a Speculative Coherent DSM," Proceedings of the 26th Annual ISCA, 12 pages, May 1999.

S. Kaxiras et al., "Improving CC–NUMA Performance Using Instruction–Based Prediction," Proceedings of the 5th Annual IEEE Symposium on High–Performance Computer Architecture (HPCA), pp. 1–25, Jan. 1999.

S. Kaxiras, "Identification and Optimization of Sharing Patterns for Scalable Shared–Memory Multiprocessors," PhD. Thesis, Computer Sciences, University of Wisconsin–Madison, 1998.

S. Kaxiras et al., "Coherence Communication Prediction in Shared Memory Multiprocessors," Proceedings of the 6th Annual IEEE Symposium on High–Performance Computer Architecture (HPCA), 12 pages, Jan. 2000.

* cited by examiner

Primary Examiner—Donald Sparks
Assistant Examiner—Christian P. Chace

(57) ABSTRACT

A set of predicted readers are determined for a data block subject to a write request in a shared-memory multiprocessor system by first determining a current set of readers of the data block, and then generating the set of predicted readers based on the current set of readers and at least one additional set of readers representative of at least a portion of a global history of a directory associated with the data block. In one possible implementation, the set of predicted readers are generated by applying a function to the current set of readers and one or more additional sets of readers.

34 Claims, 6 Drawing Sheets

FIG. 6

| TABLE 1: TOP 10 PVP DIRECT UPDATE ||||||
|---|---|---|---|---|---|
| SCHEME | SIZE | SENS. | SPEC. | PVP | PVN |
| $\text{inter}(pid+add_4)^4$ | 14 | 0.30 | 1.00 | 0.92 | 0.93 |
| $\text{inter}(pid+add_8)^4$ | 18 | 0.31 | 1.00 | 0.92 | 0.93 |
| $\text{inter}(pid+add_8)^3$ | 18 | 0.35 | 1.00 | 0.91 | 0.93 |
| $\text{inter}(pid+pc_4+add_4)^4$ | 18 | 0.35 | 1.00 | 0.90 | 0.93 |
| $\text{inter}(pid+add_4)^3$ | 14 | 0.34 | 1.00 | 0.89 | 0.93 |
| $\text{inter}(pid+dir+add_4)^4$ | 18 | 0.32 | 1.00 | 0.88 | 0.93 |
| $\text{inter}(pid+pc_4+add_4)^3$ | 18 | 0.37 | 1.00 | 0.88 | 0.93 |
| $\text{inter}(pid)^4$ | 10 | 0.29 | 1.00 | 0.88 | 0.92 |
| $\text{inter}(pid+pc_4)^4$ | 14 | 0.37 | 0.99 | 0.87 | 0.93 |
| $\text{inter}(pid+pc_8)^4$ | 18 | 0.39 | 0.99 | 0.86 | 0.93 |

| TABLE 2: TOP 10 SPEC. DIRECT UPDATE ||||||
|---|---|---|---|---|---|
| SCHEME | SIZE | SENS. | SPEC. | PVP | PVN |
| $\text{inter}(pc_4+add_8)^4$ | 18 | 0.12 | 1.00 | 0.72 | 0.91 |
| $\text{inter}(add_4)^4$ | 10 | 0.07 | 1.00 | 0.78 | 0.91 |
| $\text{inter}(pid+add_8)^4$ | 18 | 0.31 | 1.00 | 0.92 | 0.93 |
| $\text{inter}()^4$ | 8 | 0.03 | 1.00 | 0.73 | 0.90 |
| $\text{inter}(add_8)^4$ | 14 | 0.11 | 1.00 | 0.70 | 0.91 |
| $\text{inter}(pc_4+add_4)^4$ | 14 | 0.08 | 1.00 | 0.74 | 0.91 |
| $\text{inter}(pc_8+add_4)^4$ | 18 | 0.09 | 1.00 | 0.74 | 0.91 |
| $\text{inter}(pc_4)^4$ | 10 | 0.04 | 1.00 | 0.71 | 0.90 |
| $\text{inter}(pc_8)^4$ | 14 | 0.04 | 1.00 | 0.71 | 0.90 |
| $\text{inter}(pc_4+dir+add_4)^4$ | 18 | 0.20 | 1.00 | 0.73 | 0.92 |

FIG. 6 (continued)

| TABLE 3: TOP 10 SENS. DIRECT UPDATE | | | | | |
|---|---|---|---|---|---|
| SCHEME | SIZE | SENS. | SPEC. | PVP | PVN |
| union(dir+add$_4$)$^4$ | 14 | 0.67 | 0.86 | 0.40 | 0.95 |
| union(dir)$^4$ | 10 | 0.67 | 0.85 | 0.39 | 0.95 |
| union(pc$_4$+dir)$^4$ | 14 | 0.67 | 0.85 | 0.40 | 0.95 |
| union(pc$_4$+dir+add$_4$)$^4$ | 18 | 0.67 | 0.85 | 0.40 | 0.95 |
| union(dir+add$_8$)$^4$ | 18 | 0.67 | 0.87 | 0.42 | 0.95 |
| union(pc$_8$+dir)$^4$ | 18 | 0.66 | 0.86 | 0.42 | 0.95 |
| union(pid+add$_4$)$^4$ | 14 | 0.66 | 0.87 | 0.41 | 0.95 |
| union(pid+add$_8$)$^4$ | 18 | 0.66 | 0.87 | 0.42 | 0.95 |
| union(add$_{12}$)$^4$ | 18 | 0.66 | 0.86 | 0.40 | 0.95 |
| union(add$_4$)$^4$ | 10 | 0.66 | 0.80 | 0.29 | 0.95 |

| TABLE 4: TOP 10 PVP FORWARDED UPDATE | | | | | |
|---|---|---|---|---|---|
| SCHEME | SIZE | SENS. | SPEC. | PVP | PVN |
| inter(pid+pc$_4$+add$_4$)$^4$ | 18 | 0.34 | 1.00 | 0.92 | 0.93 |
| inter(pid+add$_4$)$^4$ | 14 | 0.33 | 1.00 | 0.91 | 0.93 |
| inter(pid+add$_8$)$^4$ | 18 | 0.33 | 1.00 | 0.91 | 0.93 |
| inter(pid+dir+add$_4$)$^4$ | 18 | 0.34 | 1.00 | 0.91 | 0.93 |
| inter(pid+add$_8$)$^3$ | 18 | 0.37 | 1.00 | 0.90 | 0.93 |
| inter(pid+add$_4$)$^3$ | 14 | 0.36 | 1.00 | 0.88 | 0.93 |
| inter(pid+pc$_4$+add$_4$)$^3$ | 18 | 0.37 | 1.00 | 0.88 | 0.93 |
| inter(pid+dir)$^4$ | 14 | 0.38 | 0.99 | 0.88 | 0.93 |
| inter(pid+dir+add$_4$)$^3$ | 18 | 0.37 | 1.00 | 0.88 | 0.93 |
| inter(pid)$^4$ | 10 | 0.33 | 1.00 | 0.87 | 0.93 |

FIG. 6 (continued)

| TABLE 5: TOP 10 SPEC. FORWARDED UPDATE ||||||
|---|---|---|---|---|---|
| SCHEME | SIZE | SENS. | SPEC. | PVP | PVN |
| $inter(pc_4+add_8)^4$ | 18 | 0.11 | 1.00 | 0.69 | 0.91 |
| $inter(add_4)^4$ | 10 | 0.07 | 1.00 | 0.78 | 0.91 |
| $inter()^4$ | 6 | 0.03 | 1.00 | 0.73 | 0.90 |
| $inter(add_8)^4$ | 14 | 0.11 | 1.00 | 0.70 | 0.91 |
| $inter(pid+add_8)^4$ | 18 | 0.33 | 1.00 | 0.91 | 0.93 |
| $inter(pc_8+add_4)^4$ | 18 | 0.09 | 1.00 | 0.74 | 0.91 |
| $inter(pc_4+add_4)^4$ | 14 | 0.07 | 1.00 | 0.69 | 0.91 |
| $inter(pid+pc_4+add_4)^4$ | 18 | 0.34 | 1.00 | 0.92 | 0.93 |
| $inter(pc_4+dir+add_4)^4$ | 18 | 0.18 | 1.00 | 0.73 | 0.91 |
| $inter(pc_4)^4$ | 20 | 0.03 | 1.00 | 0.61 | 0.90 |

| TABLE 6: TOP 10 SENS. FORWARDED UPDATE ||||||
|---|---|---|---|---|---|
| SCHEME | SIZE | SENS. | SPEC. | PVP | PVN |
| $union(dir+add_4)^4$ | 14 | 0.67 | 0.86 | 0.40 | 0.95 |
| $union(dir)^4$ | 10 | 0.67 | 0.85 | 0.39 | 0.95 |
| $union(dir+add_8)^4$ | 18 | 0.67 | 0.87 | 0.42 | 0.95 |
| $union(pc+dir+add_4)^4$ | 18 | 0.66 | 0.89 | 0.45 | 0.95 |
| $union(add_{12})^4$ | 18 | 0.66 | 0.86 | 0.40 | 0.95 |
| $union(pid+dir)^4$ | 14 | 0.66 | 0.89 | 0.45 | 0.95 |
| $union(add_4)^4$ | 10 | 0.66 | 0.80 | 0.29 | 0.95 |
| $union()^4$ | 6 | 0.65 | 0.77 | 0.25 | 0.95 |
| $union(add_8)^4$ | 14 | 0.65 | 0.84 | 0.35 | 0.95 |
| $union(pid+add_8)^4$ | 18 | 0.65 | 0.88 | 0.44 | 0.95 |

DIRECTORY-BASED PREDICTION METHODS AND APPARATUS FOR SHARED-MEMORY MULTIPROCESSOR SYSTEMS

FIELD OF THE INVENTION

The present invention relates generally to multiprocessor computers and other types of processing systems which include multiple processors, and more particularly to memory prediction techniques suitable for use in such systems.

BACKGROUND OF THE INVENTION

In a shared-memory multiprocessor system, it appears to a user that all processors read and modify state information in a single shared memory store. A substantial difficulty in implementing such a system, and particularly a distributed version of such a system, is propagating values from one processor to another, in that the actual values are created close to one processor but might be used by many other processors in the system. If the implementation could accurately predict the sharing patterns of a given program, the processor nodes of a distributed multiprocessor system could spend more of their time computing and less of their time waiting for values to be fetched from remote locations. Despite the development of processor features such as non-blocking caches and out-of-order instruction execution, the relatively long access latency in a distributed shared-memory system remains a serious impediment to performance.

Prediction techniques have been used to reduce access latency in distributed shared-memory systems by attempting to move data from their creation point to their expected use points as early as possible. These prediction techniques typically supplement the normal shared-memory coherence protocol, which is concerned primarily with correct operation and secondarily with performance. In a distributed shared-memory system, the coherence protocol, which is typically directory-based, keeps processor caches coherent and transfers data among the processor nodes. In essence, the coherence protocol carries out all communication in the system. Coherence protocols can either invalidate or update shared copies of a data block whenever the data block is written. Updating involves forwarding data from producer nodes to consumer nodes but does not provide a feedback mechanism to determine the usefulness of data forwarding. Invalidation provides a natural feedback mechanism, in that invalidated readers must have used the data, but invalidation provides no means to forward data to its destination.

A conventional prediction approach described in S. S. Mukherjee and M. D. Hill, "Using Prediction to Accelerate Coherence Protocols," Proceedings of the 25th Annual International Symposium on Computer Architecture (ISCA), June–July 1998, uses address-based 2-level predictors at the directories and caches of the processor nodes of a multiprocessor system to track and predict coherence messages. A. Lai and B. Falsafi, "Memory Sharing Predictor: The Key to a Speculative Coherent DSM," Proceedings of the 26th Annual ISCA, May 1999, describe how these 2-level predictors can be modified to use less space, by coalescing messages from different nodes into bitmaps, and show how the modified predictors can be used to accelerate reading of data Another set of known prediction techniques, described in S. Kaxiras and J. R. Goodman, "Improving CC-NUMA Performance Using Instruction-Based Prediction," Proceedings of the 5th Annual IEEE Symposium on High-Performance Computer Architecture (HPCA), January 1999, provides instruction-based prediction for migratory sharing, wide sharing and producer-consumer sharing. Since static instructions are far fewer than data blocks, instruction-based predictors require less space to capture sharing patterns.

Despite the advances provided by the above-identified prediction techniques, a need remains for additional improvements, so as to further reduce access latency and thereby facilitate the implementation of shared-memory multiprocessor systems.

SUMMARY OF THE INVENTION

The invention provides improved techniques for determining a set of predicted readers of a data block subject to a write request in a shared-memory multiprocessor system. In accordance with an aspect of the invention, a current set of readers of the data block are determined, and then the set of predicted readers is generated based on the current set of readers and at least one additional set of readers representative of at least a portion of a global history of a directory associated with the data block. In one possible implementation, the set of predicted readers is generated by applying a function to the current set of readers and one or more additional sets of readers. The function may be, for example, a union function, an intersection function or a pattern-based function, and the directory and data block may be elements of a memory associated with a particular processor node of the multiprocessor system.

The global history of the directory comprises multiple sets of previous readers processed by the directory, with the total number of sets of previous readers corresponding to a designated history depth associated with generation of the set of predicted readers. The global history may be maintained, for example, in a shift register having a number of storage locations corresponding to the designated history depth. The history depth is preferably selected as a value greater than two, such as four.

In operation, the directory or other processor node element associated with the data block subject to the write request sends an invalidation request to each of the readers in the current set of readers, and upon receipt of an invalidation acknowledgment from each of the readers in the current set of readers, sends a valid copy of the data block to a writer which generated the write request. Each reader in the system may maintain an accessed bit for each of a number of data blocks, the accessed bit of a particular reader for a given data block indicating whether the particular reader has actually read the given data block. The accessed bit information may be sent by the particular reader to the directory in conjunction with an invalidation acknowledgment. After the requested write on the data block is completed, the resulting data block is sent to each of the readers in the set of predicted readers.

In accordance with another aspect of the invention, the above-noted function may be selected dynamically. For example, the function may be selected on a per-program basis, such that each of a number of programs running in the multiprocessor system can independently determine the function to be applied to determine the set of predicted readers. As another example, the function may be selected under program control at run time by a given program running on the multiprocessor system. As a further example, the function may be selected on a per-page basis, such that the function applied can be determined independently for each of a number of memory pages, each of which may include multiple data blocks. As yet another example, the function may be selected based at least in part on information regarding network utilization. Various combinations of these and other types of information may also be used in the dynamic selection of the above-noted function.

The prediction process in accordance with the present invention may use additional information in conjunction with the above-described directory information, such as a designated subset of cache address information, processor node identification information, or program counter information.

Advantageously, the prediction techniques of the present invention provide improved prediction accuracy, both in terms of fewer false positives and fewer false negatives, relative to conventional techniques.

These and other features and advantages of the present invention will become more apparent from the accompanying drawings and the following detailed description.

BRIEF DESCRIPTION OF THE DRAWINGS

FIG. 6 shows a set of tables listing examples of predictors in accordance with the invention.

DETAILED DESCRIPTION OF THE INVENTION

The invention will be illustrated herein in conjunction with exemplary distributed shared-memory multiprocessor systems. It should be understood, however, that the invention is more generally applicable to any shared-memory multiprocessor system in which it is desirable to provide improved performance through the use of directory-based prediction. The term "multiprocessor system" as used herein is intended to include any device in which retrieved instructions are executed using two or more processors. Exemplary processors in accordance with the invention may include, for example, microprocessors, central processing units (CPUs), very long instruction word (VLIW) processors, single-issue processors, multi-issue processors, digital signal processors, application-specific integrated circuits (ASICs), personal computers, mainframe computers, network computers, workstations and servers, and other types of data processing devices, as well as portions and combinations of these and other devices.

Figure 1:
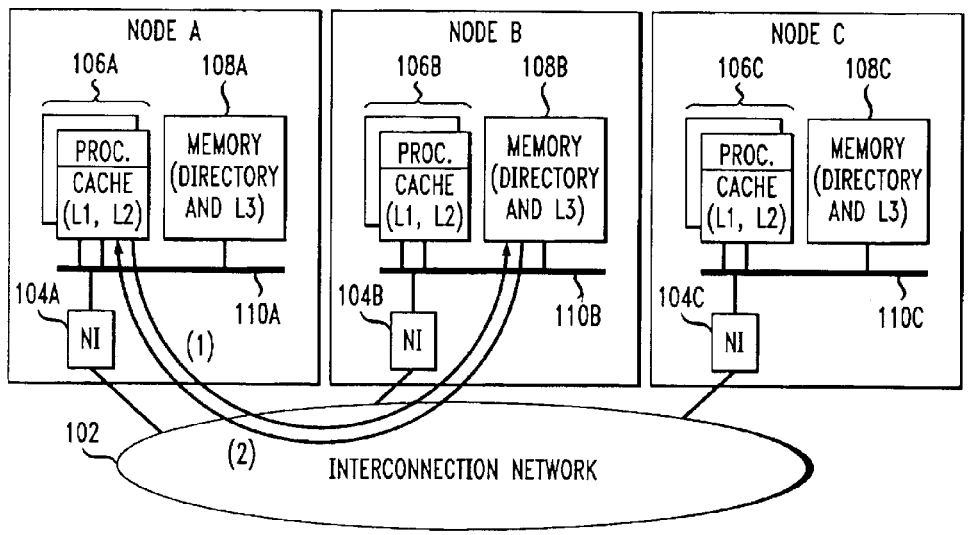
FIGS. 1 and 2 illustrate the operation of a distributed shared-memory multiprocessor system in which a directory-based predictor may be implemented in accordance with the present invention.
Figure 2:
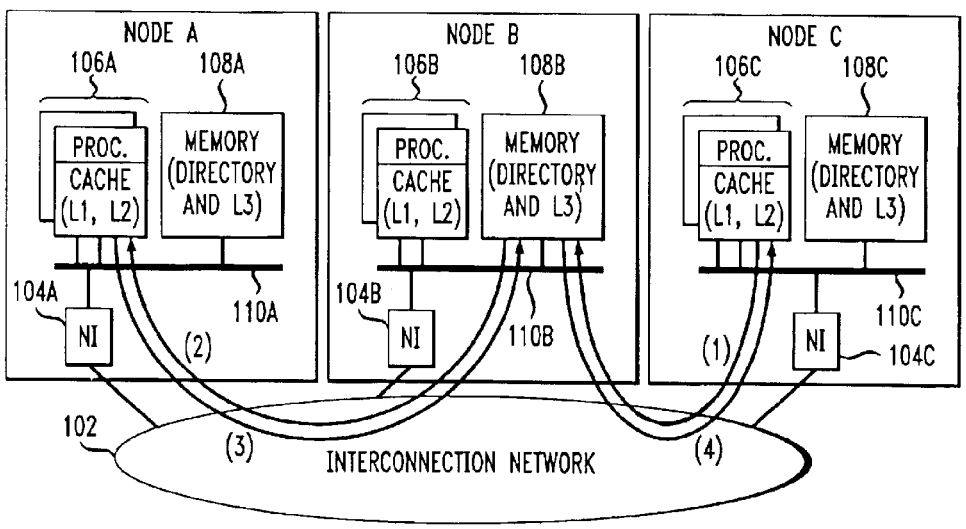

FIGS. 1 and 2 illustrate the handling of example exemplary read and write requests, respectively, in a distributed shared-memory multiprocessor system 100. The system 100 is an example of one type of system in which the directory-based prediction of the present invention may be implemented. The system 100 includes nodes A, B and C, which are connected to an interconnection network 102 via corresponding network interfaces (NIs) 104A, 104B and 104C, respectively. The nodes A, B and C include processors 106A, 106B and 106C, memories 108A, 108B and 108C, and buses 110A, 110B and 110C, respectively, arranged as shown. Within a given node i of the system 100, i=A, B, C, the processor 106$i$, memory 108$i$ and network interface 104$i$ are each coupled to and communicate over the corresponding bus 110$i$.

Associated with each of the processors 106$i$ in the system 100 is a set of caches L1 and L2, and associated with each of the memories 108$i$ is a directory and a cache L3. Each of the memories 108$i$ is managed by its corresponding unique directory. The memories 108$i$ or portions thereof are referred to herein as data blocks or simply blocks. Although there are multiple directories in the system 100, each block in this illustrative embodiment is managed by just one of them. If a would-be reader or would-be writer does not have an up-to-date copy of a block, it asks the corresponding directory to find the most recent version of the block. The directory may have to invalidate one or more current copies of the block in order to answer a request.

Also illustrated in FIG. 1 is an example of a read operation in which processor 106A of node A reads data from memory 108B of node B. As part of this operation, read request (1) goes from node A to node B, and reply (2) returns from node B to node A. Node A caches the data in its local cache hierarchy, i.e., caches L1, L2 and L3. The directory in node B stores an indication that node A has a copy of the data. Other nodes read data from node B in the same manner.

It should be noted that the terms "reader" and "writer" as used herein are intended to include without limitation a given processor node or its associated processor, as well as elements or portions of a processor node or its associated processor.

FIG. 2 shows a write operation in which processor 106C of node C writes the same data residing in memory 108B of node B. As part of this operation, write request (1) goes from node C to node B. Because the directory in node B knows that node A has a copy of the data, it sends an invalidation request (2) to node A. Node A sends an acknowledgment (3) of the invalidation of its copy of the data Node B then sends the data (4) to node C for writing since there are no more copies in the system.

A given memory block in the system 100 thus may be viewed as alternating between phases of being written by a single processor and being read by one or more processors. The directory associated with the given block manages these alternating phases, maintaining a consistent version of the block at all times.

It should be noted that the particular arrangements of caches and cache levels shown in FIGS. 1 and 2 are examples only, and should not be construed as limiting the scope of the present invention in any way. The invention may be implemented using a wide variety of different cache architectures or multiprocessor system configurations.

Figure 3:
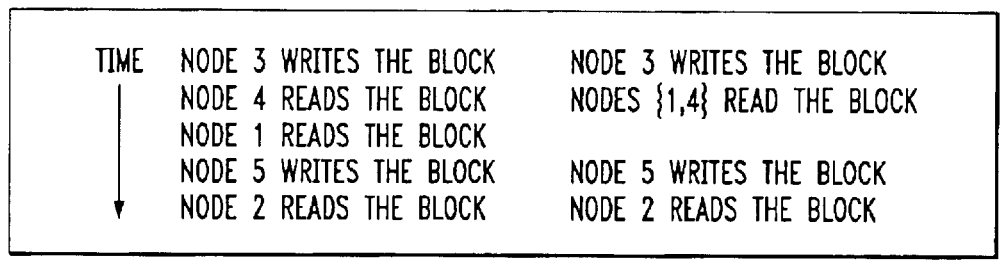
FIG. 3 shows an example of sequence of events and an aggregation of readers.

FIG. 3 illustrates an example of these alternating phases for a single block in a system having five nodes denoted 1, 2, 3, 4 and 5. The left side of the figure shows the raw sequence of read and write events relating to the single block, and the right side of the figure shows a summary of the above-noted phases. As is apparent from this example, it is generally safe for multiple readers to examine the most-recently-generated version of a block.

The present invention in an illustrative embodiment provides a directory-based prediction mechanism which predicts the next set of readers of a block when a write request goes from the writer to the directory associated with the block. The mechanism predicts a likely set of readers of the value produced by the writer, and after the writer has finished writing, this prediction is used to forward the data to all the predicted readers. Unlike conventional predictors which distinguish among blocks or among instructions to keep separate histories for blocks in the system, the prediction mechanism of the present invention merges together multiple sets of readers for multiple blocks served by the directory. This information is referred to herein as the global history of the directory.

In the exemplary implementation of the illustrative embodiment to be described in conjunction with FIG. 4 below, a history depth of four is used, i.e., the predicted set of readers generated for a current write operation on a given block is determined as a function of the current set of readers of that block and the three other most recent sets of readers stored in a predictor shift register.

Figure 4:
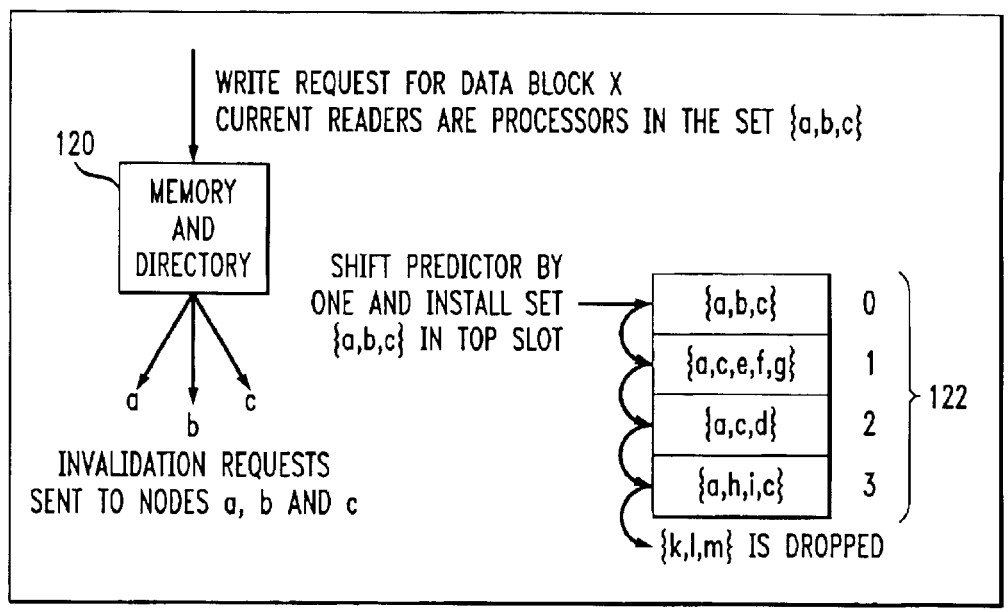
FIG. 4 shows an example of directory-based prediction in accordance with the invention.

FIG. 4 shows an example of the operation of a directory-based predictor in the illustrative embodiment of the invention. In this example, a write request is received for a data block X associated with a memory and directory 120. The current readers of the data block X are processors in a set of nodes (a, b, c) of a multiprocessor system which includes nodes denoted a, b, c, d, e, f, g, h, i, j, k, l, m, etc. Each of the nodes may represent a node of a multiprocessor system such as that illustrated in conjunction with FIGS. 1 and 2. The predictor in this example uses a shift register 122 in a manner to be described below.

Figure 5:
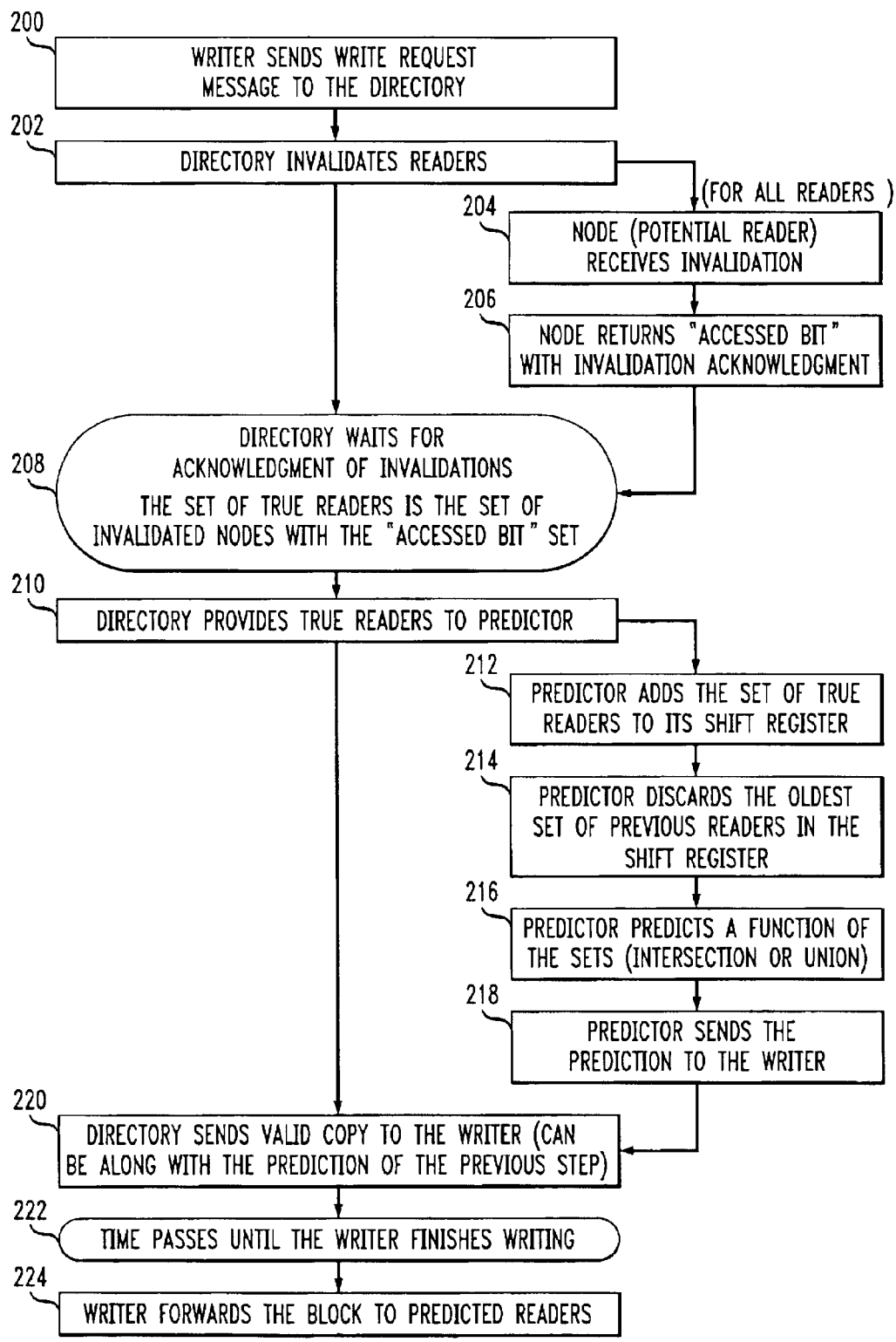
FIG. 5 is a flow diagram of a directory-based prediction process in accordance with the invention.

FIG. 5 shows a flow diagram of the general processing operations of the directory-based predictor of the FIG. 4 example. The general operations will first be described with reference to FIG. 5, and then the application of the general operations to the FIG. 4 example will be described in detail.

In step 200 of FIG. 5, a writer sends a write request message to the directory of the block to be written. The directory in step 202 invalidates the current readers. Steps 204 and 206 are then performed by each of the readers. In step 204, a given node corresponding to a potential reader receives the invalidation from the directory. In step 206, the node returns an "accessed bit" with an acknowledgment of the invalidation.

As indicated in step 208, the directory waits for invalidation acknowledgments from the readers. A set of true readers is determined as the set of invalidated nodes for which the returned accessed bit is set. The directory in step 210 provides information identifying the set of true readers to the predictor.

The predictor then adds the set of true readers to its shift register (step 212), discards the oldest set of previous readers in the shift register (step 214), predicts a function of the sets using an intersection or union operation (step 216), and sends the prediction to the writer (step 218).

The directory in step 220 sends a valid copy of the block to the writer. This copy may be sent to the writer along with the prediction of step 218. In step 222, time passes until the writer finishes the write operation. After the write operation is completed, the writer uses the information in the prediction to forward the new block to each predicted reader, as shown in step 224.

Suitable techniques for determining an appropriate time for forwarding a new block to each predicted reader are described in, e.g., S. Kaxiras, "Identification and Optimization of Sharing Patterns for Scalable Shared-Memory Multiprocessors," PhD. Thesis, Computer Sciences, University of Wisconsin-Madison, 1998, and in the above-cited reference A. Lai and B. Falsafi, "Memory Sharing Predictor: The Key to a Speculative Coherent DSM," Proceedings of the 26th Annual ISCA, May 1999, both of which are incorporated by reference herein.

The choice of union function or intersection function in step 216 of FIG. 5 generally depends on the desired degree of aggressiveness in the data forwarding. For example, in high-bandwidth systems, the more aggressive data forwarding associated with the union function may be more appropriate, while for low-bandwidth systems, the intersection function may be more appropriate. It should be noted that these functions are given by way of example only, and the invention can be implemented using other types of functions. As another example, pattern-based functions can be used in conjunction with the present invention. Such functions are described in greater detail in, e.g., T. Yeh and Y. Patt, "Two-Level Adaptive Branch Prediction," Proceedings of the 24th Annual ACM/IEEE International Symposium and Workshop on Microarchitecture, Los Alamitos, Calif., November 1991, which is incorporated by reference herein.

The choice between union, intersection or other functions in step 216 can be made on a dynamic basis. For example, the choice may be made on a per-program basis, such that each program can set its own mode of operation. As another example, the choice of function may be implemented under program control, such that programs can change the mode of operation at run-time according to their needs. The choice could alternatively be made on a per-page basis, with each memory page, which may be comprised of multiple data blocks, having its own mode. In this case, an operating system may notify the predictor about the mode of operation of various pages. As yet another example, the choice of function could be made in accordance with network utilization, e.g., with low network utilization calling for the union function, and high network utilization calling for the intersection function. In this case, a network monitor device may be used to supply feedback to the prediction mechanism.

Referring again to the example of FIG. 4, when the write request for data block X is received, the current readers are the processors in the set {a, b, c}. The predictor shift register 122 is shifted by one as shown, and the set {a, b, c} is installed in the top slot, denoted slot 0. As a result of the shift, slots 1, 2 and 3 contain the sets {a, c, e, f, g}, {a, c, d} and {a, h, i, c}, respectively, and the set {k, l, m} is dropped from the shift register. The current contents of the shift register 122 at a given point in time represent the global history of the corresponding directory. The directory invalidates the current readers by sending invalidation requests to the nodes a, b and c, waits for acknowledgment of the invalidation, and later sends a valid copy of data block X to the requesting writer.

The predictor determines the union or the intersection of the sets in the shift register 122, in accordance with step 216 of FIG. 5, choosing union or intersection based on one or more of the factors described above. The union of the sets in the shift register is the set {a, b, c, d, e, f, g, h, i}, while the intersection of the sets in the shift register is the set {a, c}. In either case, the result is a set of predicted readers which is sent by the predictor to the writer. After the write operation on data block X is completed, the writer forwards the new block to each of the predicted readers. The triggering of the data forwarding can be based on a timer, or by the next write to the directory regardless of which data block is written, or by the next read to data block X, or by other suitable techniques. The data forwarding may be implemented by the directory fetching a copy of the data from the writer and sending it to the predicted reader nodes.

It should be noted that, although the predictor in the FIG. 4 example uses a history depth of four, i.e., the shift register 122 stores the four most recent sets of readers for a given data block, the present invention can be implemented using other history depths, including history depths greater or less than four. Conventional predictors generally utilize a history depth no greater than two.

In order to provide accurate feedback to the above-described prediction mechanism, each reader generally must be able to distinguish between a predicted read and an actual read. When a writer gains exclusive access to a cache block, a multiprocessor system in accordance with the invention predicts the future set of readers of the block, then ensures that copies of the block are forwarded to those predicted readers after the write has completed. In order to close the feedback loop, the system must find out how many of those predicted readers actually used the block. To tell whether this is the case, each reader in the system may maintain the above-noted "accessed bit" for each locally cached line. This accessed bit is similar to the so-called "dirty bit" kept for paging in a virtual memory system, except that the accessed bit will be set when a cache block is read, rather than when it is written. Also, the accessed bit should be maintained at cache block granularity, while dirty bits are typically maintained at page granularity. At the next invalidation, each reader piggybacks the accessed bit information on the invalidation acknowledgment. The system can then use the accessed bits to update its state for the next prediction.

It should be noted that processing operations referred to herein as being performed or otherwise implemented by a directory may be performed or otherwise implemented by an associated element of a processor node, such as by a processor under program control.

In alternative embodiments of the invention, the directory information can be supplemented by other information in order to provide further performance improvements. For example, the directory information can be supplemented with a designated subset of cache-block-address information. Advantageously, such an arrangement uses less information than conventional address-based prediction techniques, while also achieving a higher prediction accuracy. In other embodiments of the invention, the directory information with or without the subset of the cache address information can be combined with other types of information, such as processor node and program counter information. For example, the invention may utilize various combinations of directory, address, processor node and program counter information in the process of determining a set of predicted readers for a given write request.

As the term is used herein, the "global history" of a directory is intended to include not only a history based on directory information alone, but also a history which includes directory information as well as an amount of additional information, such as address, processor node or program counter information, which is less than the full available amount of such additional information. For example, a global history may include directory information supplemented with a small number of address bits, i.e., an amount of address bits less than a full set of available address bits.

FIG. 6 shows a set of six tables listing examples of predictors in accordance with the invention and corresponding performance simulation results. The predictors shown are based on various combinations of one or more of directory (dir), address (add), processor node (pid) and program counter (pc) information. The predictor names are of the form prediction-function(index)$^{depth}$, where prediction-function indicates the function used to update the predictor, index indicates the particular combination of directory, address, processor node and program counter information used by the predictor, and depth is the history depth. In the case of address (add) or program counter (pc) information, the corresponding identifier includes a subscript indicating the corresponding number of bits of information.

The predictors shown in FIG. 6 are also classified as either direct or forwarded to indicate the particular update mechanism used. In a direct update mechanism, each time a data block is written, the set of invalidated true readers are used as history to generate the new prediction. In a forwarded update mechanism, when a writer invalidates a set of readers associated with another node, it forwards this history to the appropriate predictor entry so it can be used by the correct writer. Forwarded update thus requires last-writer information for each data block so invalidated readers can be associated with a specific writer. Tables 1, 2 and 3 of FIG. 6 list predictors which utilize a direct update mechanism, while Tables 4, 5 and 6 list predictors which utilize a forwarded update mechanism.

By way of example, the predictor union(pid+dir+add$_4$)$^4$ in Table 6 represents a prediction scheme using direct update, indexing its prediction state using the processor number, directory node, and four bits of data-block address, and unioning the last two sharing bitmaps to predict the next one for each index. As another example, a last-bitmap predictor indexed by directory node and eight bits of address information may be denoted union(dir+add$_8$)$^1$ or inter(dir+add$_8$)$^1$, depending on the particular function used. It should be noted that a union-based or intersection-based predictor with a history depth of one is the same as a last-bitmap predictor.

Additional details regarding these and other aspects of predictors are described in S. Kaxiras and C. Young, "Coherence Communication Prediction in Shared Memory Multiprocessors," Proceedings of the 6th Annual IEEE Symposium on High-Performance Computer Architecture (HPCA), January 2000, which is incorporated by reference herein.

For each of the example predictors shown in FIG. 6, a number of performance parameters are listed. These include predictor size, sensitivity, specificity, predictive value of a positive test (PVP) and predictive value of a negative test (PVN).

The predictor size is measured as log$_2$ of the number of bits utilized by the predictor.

Sensitivity is the ratio of correct predictions to the sum of correct predictions and omitted predictions, and indicates how well the predictor predicts sharing when sharing will indeed take place. A sensitive predictor is good at finding and exploiting opportunities for sharing, while an insensitive predictor misses many opportunities.

Specificity is the ratio of avoided predictions to the sum of avoided predictions and extra predictions, and indicates the likelihood that no resources will be wasted on unshared data.

PVP is the ratio of correct predictions to the sum of correct and extra predictions, and provides an indication of the percentage of useful data-forwarding traffic out of all data-forwarding traffic.

PVN is the ratio of avoided predictions to the sum of avoided predictions and omitted predictions, and provides an indication as to how likely an unshared block is to be correctly predicted not to be shared.

Tables 1 and 4 show the ten predictors with the highest PVPs under direct update and forwarded update, respectively, of a set of possible predictors for which performance was simulated. All of the predictors in this group are deep-history intersection predictors, which will maximize PVP by speculating only on very stable sharing relationships. Two of the top-ten schemes are common to the two tables. It can be seen that direct update and forwarded update have very little influence on PVP. However, the forwarded schemes on average are more sensitive. None of the high-PVP schemes is sensitive compared to a last-bitmap or union-predictor scheme. This means that they will generate very productive traffic, but they will miss many opportunities for sharing.

Tables 2 and 5 show the top ten schemes, in terms of specificity, in the set of possible predictors using direct update and forwarded update, respectively.

Tables 3 and 6 show the top ten schemes, in terms of sensitivity, in the set of possible predictors using direct update and forwarded update, respectively. All are union schemes with the maximum history depth used in this example, i.e., a history depth of 4.

Tables 5 and 6 show the top ten predictors in the set of possible forwarded update predictors in terms of specificity and sensitivity, respectively.

It should again be emphasized that the predictors shown in FIG. 6 are examples only, and the invention may be implemented using other types of predictors. For example, although the maximum history depth in the FIG. 6 examples is four, other predictors may use greater history depths.

The present invention may be configured to meet the requirements of a variety of different processing applications and environments, using any desired types and arrangements of processors. The above-described embodiments of the invention are therefore intended to be illustrative only. Numerous alternative embodiments within the scope of the following claims will be apparent to those skilled in the art.

What is claimed is:

1. A method of determining a set of predicted readers of a data block in a multiprocessor system, the method comprising the steps of:

determining a current set of readers of a data block which is subject to a write request; and generating the set of predicted readers based on the current set of readers and at least one additional set of readers representative of at least a portion of a global history of a directory associated with the data block.

2. The method of claim 1 wherein the generating step further comprises the step of applying a function to the current set of readers and at least one additional set of readers.

3. The method of claim 2 wherein the function comprises at least one of a union function, an intersection function and a pattern-based function.

4. The method of claim 1 wherein the directory and the data block comprise elements of a memory associated with a processor node of the multiprocessor system.

5. The method of claim 1 wherein the global history of the directory comprises a plurality of sets of previous readers processed by the directory, the total number of the plurality of sets of previous readers corresponding to a designated history depth associated with generation of the set of predicted readers.

6. The method of claim 5 wherein the global history is maintained in a shift register having a number of storage locations corresponding to the designated history depth.

7. The method of claim 6 wherein the history depth is greater than two.

8. The method of claim 1 wherein each reader in the system maintains an accessed bit for each of a plurality of data blocks, the accessed bit of a particular reader for a given data block indicating whether the particular reader has actually read the given data block.

9. The method of claim 8 wherein accessed bit information is sent by the particular reader to the directory in conjunction with an invalidation acknowledgment.

10. The method of claim 1 wherein after the requested write on the data block is completed, the resulting data block is sent to each of the readers in the set of predicted readers.

11. The method of claim 1 wherein the generating step utilizes a direct update mechanism.

12. The method of claim 1 wherein the generating step utilizes a forwarded update mechanism.

13. The method of claim 2 wherein the function is selected dynamically.

14. The method of claim 13 wherein the function is selected on a per-program basis, such that each of a plurality of programs running in the multiprocessor system can independently determine the function to be applied to determine the set of predicted readers.

15. The method of claim 13 wherein the function is selected under program control and can be selected at run time by a given program running on the multiprocessor system.

16. The method of claim 13 wherein the function is selected on a per-page basis, such that the function applied can be determined independently for each of a plurality of memory pages, each of which may be comprised of one or more data blocks.

17. The method of claim 13 wherein the function is selected based at least in part on information regarding network utilization.

18. The method of claim 1 wherein the generating step further includes utilizing information regarding the global history of the directory in conjunction with at least a subset of cache address information associated with one or more of the readers to determine the set of predicted readers.

19. The method of claim 1 wherein the generating step further includes utilizing information regarding the global history of the directory in conjunction with processor node information associated with one or more of the readers to determine the set of predicted readers.

20. The method of claim 1 wherein the generating step further includes utilizing information regarding the global history of the directory in conjunction with program counter information associated with one or more of the readers to determine the set of predicted readers.

21. The method of claim 1 wherein each of at least a subset of the readers corresponds to a particular processor node in the multiprocessor system.

22. An apparatus for determining a set of predicted readers of a data block in a multiprocessor system, the apparatus comprising:

a processor node operative to determine a current set of readers of a data block which is subject to a write request, and to implement a prediction mechanism which generates the set of predicted readers based on the current set of readers and at least one additional set of readers representative of at least a portion of a global history of a directory associated with the data block.

23. The apparatus of claim 22 wherein the set of predicted readers is generated at least in part by applying a function to the current set of readers and at least one additional set of readers.

24. The apparatus of claim 23 wherein the function comprises at least one of a union function, an intersection function and a pattern-based function.

25. The apparatus of claim 22 wherein the directory and the data block comprise elements of a memory associated with the processor node.

26. The apparatus of claim 22 wherein the global history of the directory comprises a plurality of sets of previous readers processed by the directory, the total number of the plurality of sets of previous readers corresponding to a designated history depth associated with generation of the set of predicted readers.

27. The apparatus of claim 26 wherein the global history is maintained in a shift register having a number of storage locations corresponding to the designated history depth.

28. A multiprocessor system comprising:

a plurality of processor nodes, at least a given one of the processor nodes being operative to determine a current set of readers of a data block which is subject to a write request, the given processor node implementing a prediction mechanism which generates a set of predicted readers of the data block based on the current set of readers and at least one additional set of readers representative of at least a portion of a global history of a directory associated with the data block.

29. The system of claim 28 wherein the set of predicted readers are generated at least in part by applying a function to the current set of readers and at least one additional set of readers.

30. The system of claim 29 wherein the function comprises at least one of a union function, an intersection function and a pattern-based function.

31. The system of claim 28 wherein the directory and the data block comprise elements of a memory associated with the given processor node.

32. The system of claim 28 wherein the global history of the directory comprises a plurality of sets of previous readers processed by the directory, the total number of the plurality of sets of previous readers corresponding to a designated history depth associated with generation of the set of predicted readers.

33. The system of claim 32 wherein the global history of the directory is maintained in a shift register associated with a corresponding one of the processor nodes and having a number of storage locations corresponding to the designated history depth.

34. The system of claim 28 wherein each of at least a subset of the readers corresponds to a particular one of the processor nodes in the multiprocessor system.

* * * * *